US012765678B2

(12) United States Patent
Zhu et al.

(10) Patent No.: US 12,765,678 B2
(45) Date of Patent: Oct. 20, 2026

(54) NECK PILLOW WITH VIBRATION UNIT AND CONTROL UNIT

(71) Applicant: Zhejiang Youdian Medical Technology Co., Ltd., Ningbo (CN)

(72) Inventors: Yueping Zhu, Ningbo (CN); Xin Guo, Ningbo (CN)

(73) Assignee: Zhejiang Youdian Medical Technology Co., Ltd., Ningbo (CN)

( * ) Notice: Subject to any disclaimer, the term of this patent is extended or adjusted under 35 U.S.C. 154(b) by 0 days.

(21) Appl. No.: 19/312,061

(22) Filed: Aug. 27, 2025

(65) Prior Publication Data

US 2026/0206974 A1 Jul. 23, 2026

(30) Foreign Application Priority Data

Jan. 20, 2025 (CN) ........................ 202520131072.3

(51) Int. Cl.

*A47C 7/38* (2006.01)
*A47G 9/10* (2006.01)
*A61H 23/02* (2006.01)

(52) U.S. Cl.

CPC ............ *A47C 7/383* (2013.01); *A47G 9/1027* (2013.01); *A47G 9/1081* (2013.01); *A61H 23/0254* (2013.01); *A61H 2201/0134* (2013.01); *A61H 2201/1609* (2013.01); *A61H 2205/04* (2013.01)

(58) Field of Classification Search

CPC .... A47C 7/383; A47G 9/1027; A47G 9/1081; A47G 2200/183; A47G 2200/205; A47G 9/1045; A47G 2009/006; A47G 2009/1018; A47G 2200/14; A61H 23/0254; A61H 2201/0134; A61H 2201/1609; A61H 2205/04; A61H 7/004; A61H 2201/0149; A61H 2201/0228

See application file for complete search history.

(56) References Cited

U.S. PATENT DOCUMENTS

2011/0275966 A1* 11/2011 Alkhattaf ............. A47G 9/1027 5/644

FOREIGN PATENT DOCUMENTS

| | | | | | |
|---|---|---|---|---|---|
| CN | 109793655 A | | 5/2019 | | |
| CN | 211533763 U | | 9/2020 | | |
| CN | 114851934 A | * | 8/2022 | ............. | B60N 2/879 |
| CN | 222304322 U | * | 1/2025 | | |
| KR | 20190115403 A | * | 10/2019 | ............. | A61H 7/004 |

* cited by examiner

*Primary Examiner* — Madison Matthews

(74) *Attorney, Agent, or Firm* — JEEN IP LAW, LLC

(57) ABSTRACT

Disclosed is a neck pillow with a vibration unit and a control unit, which relates to the nursing equipment technical field. The neck pillow includes a pillow main body, an inflation assembly, and a power source. The pillow main body includes an inner ring part and an outer ring part. The vibration unit is disposed at a middle position of the inner ring part, and the control unit is disposed at a middle position of the outer ring part. A plurality of vibration motors are disposed in the vibration unit, and a control valve of the inflation assembly is disposed in the control unit. The control unit further includes a first channel, the pillow main body includes a second channel, and the first channel and the second channel are in communication.

10 Claims, 4 Drawing Sheets

NECK PILLOW WITH VIBRATION UNIT AND CONTROL UNIT

CROSS-REFERENCE TO RELATED APPLICATIONS

The application claims priority to Chinese patent application No. 2025201310723, filed on Jan. 20, 2025, the entire contents of which are incorporated herein by reference.

TECHNICAL FIELD

The present disclosure relates to the nursing equipment technical field, and more specifically, to a neck pillow with a vibration unit and a control unit.

BACKGROUND

With an acceleration of people's work rhythm, an improvement of living standards, and an opening of ideology, more and more people spend time during business trips, and the most common means of transportation for business trips are airplanes, high-speed trains, buses, and the like. When people ride on means of transportation such as airplanes, high-speed trains, and buses, people need to continuously maintain a restrictive sitting posture. Due to a fixed seat curvature and a cramped space, people are very prone to developing a feeling of limb stiffness and fatigue.

In addition, due to reasons such as long-term business trips and work, people inevitably need to relieve mental and physical fatigue through rest. Therefore, a U-shaped neck pillow has become a common item for people in environments such as during business trips, in offices, and in home life. The U-shaped neck pillow is capable of providing soft support for a head at the inter-neck area, relaxing inter-neck pressure, relieving fatigue and soreness, and assisting people to rest in a reasonable and comfortable posture.

However, ordinary neck pillows can no longer satisfy the diverse needs of users, so neck pillows have been developed with multiple functions, for example, neck massage, reminding a user of time, and adjusting a user's head posture. Having these functions requires a partitioned arrangement for the neck pillow, which easily leads to problems such as a complex structure that is difficult to manufacture, and an overweight condition that is not suitable for long-term wearing.

Patent CN201420443302.1 discloses a neck pillow with a time reminder function, comprising a neck pillow body, the neck pillow body comprises a left pillow body and a right pillow body, the left pillow body and the right pillow body extend to a same side of the neck pillow body to form a space for accommodating a head, where: the neck pillow body has at least one inflatable airbag capable of being inflated and deflated disposed therein, a controller and a power supply are further disposed on the neck pillow body, the controller is respectively connected to a timer device, a vibration device, and a display device, the power supply is respectively connected to the controller, the timer device, the vibration device, and the display device and supplies power to the controller, the timer device, the vibration device, and the display device; the controller is further connected to a device switch. The defect of the solution is that: the vibration device, the controller, and the timer device are all disposed on the inner ring part of the neck pillow, the weight at the position is overweight, while the device switch and the display device are located at an end of the neck pillow, the overall center of gravity is located behind the neck, which easily causes a problem of the neck pillow falling towards a back of the neck when a user wears the neck pillow, not conforming to an ergonomic design.

Patent CN202322526172.X discloses a neck pillow, the neck pillow comprising: a head contact pillow body, the head contact pillow body surrounds to form a neck accommodating space, and includes a filling material; and a shoulder contact airbag, the shoulder contact airbag surrounds to form the neck accommodating space, and is connected to the head contact pillow body. Because the shoulder contact airbag is provided, a function of stretching a shoulder and a neck can be achieved by inflating the shoulder contact airbag. Because the head contact pillow body includes the filling material, and the filling material is generally relatively soft, or in other words, is relatively easily deformable, during a process of stretching the shoulder and the neck by inflating the shoulder contact airbag, a force perceived by a user's head, especially a user's lower jaw, is relatively appropriate, and there is no obvious sense of pressure, thereby improving a comfort of the user during a process of using the neck pillow. The defect of the solution is that: a position arrangement of various components on the neck pillow is unreasonable. Because a massage head protrudes toward a direction of a neck relative to a hot compress piece, the hot compress piece does not easily attach to or fit with a rear of the neck, a rear of the user's neck has difficulty fitting a position of an inner ring center of the neck pillow, and directly attaching to the massage head for a long time also does not provide sufficient comfort.

In summary, existing multifunctional neck pillows have many problems in design: a complex neck pillow structure, an unreasonable weight distribution, and being uncomfortable to wear.

SUMMARY

An object of the present disclosure is to provide a neck pillow with a vibration unit and a control unit, to solve problems of existing multifunctional neck pillows such as having a complex structure, an unreasonable weight distribution, and being uncomfortable to wear, and to improve practicability and comfort of the neck pillow by adopting a reasonable partitioned arrangement to achieve functional integration.

To solve the foregoing technical problems, the present application is implemented through the following technical solution: a neck pillow with a vibration unit and a control unit, comprising a pillow main body, an inflation assembly, and a power source, the pillow main body comprising an inner ring part and an outer ring part, the vibration unit being disposed at a middle position of the inner ring part, the control unit being disposed at a middle position of the outer ring part, a plurality of vibration motors being disposed in the vibration unit, a control valve of the inflation assembly being disposed in the control unit, the control unit further comprising a first channel, the pillow main body comprising a second channel, and the first channel and the second channel being in communication.

In an embodiment, a first placement part and a second placement part are respectively disposed on left and right sides of the outer ring part, and the first placement part and the second placement part are symmetrically arranged relative to a center of the pillow main body.

In an embodiment, the power source further comprises wires, the vibration unit comprises a third channel, and the wires start from the second placement part, enter the control unit along the outer ring part, pass through the first channel, the second channel, and the third channel to enter the vibration unit and connect with the plurality of vibration motors.

In an embodiment, the vibration unit and the control unit are disposed together on a center line of the pillow main body.

In an embodiment, the inflation assembly comprises an air pump, and the air pump is fixed in the first placement part; and, the first placement part comprises a first lower cover and a first upper cover.

In an embodiment, the air pump is connected to the power source.

In an embodiment, the power source controls the air pump to inflate and deflate a first airbag and a second airbag.

In an embodiment, the power source comprises a battery and a circuit board, the circuit board and the battery are disposed in the second placement part; and, the second placement part comprises a second upper cover and a second lower cover.

In an embodiment, two symmetrically arranged vibration motors are disposed in the vibration unit, and the vibration motors are eccentric vibration motors.

In an embodiment, the inflation assembly further comprises a first airbag and a second airbag; and, the first airbag and the second airbag are both double-layer airbags.

In an embodiment, when the first airbag or the second airbag is inflated, a motion direction of the first airbag or the second airbag is upward inflation or obliquely upward inflation, to support a user's lower jaw, and support a deflected head to make the deflected head upright.

In an embodiment, the vibration unit comprises an arc-shaped housing and a cover, the arc-shaped housing comprises at least one arc-shaped surface, and two ends of the arc-shaped surface are tangent to the inner ring part.

In an embodiment, a plurality of buttons are disposed on the second upper cover, the plurality of buttons are used for switching a neck pillow mode, and the neck pillow comprises at least a vibration mode and an inflation mode.

In an embodiment, the neck pillow comprises a massage mode, and the power source controls the vibration unit to generate vibration.

In an embodiment, the neck pillow further comprises a first judgment unit, the first judgment unit comprises a microphone sensor and a data acquisition collector, and when the first judgment unit determines that a user is in a snoring state, a control system drives the vibration unit to vibrate and/or drives an air pump to cause the first airbag or the second airbag to be inflated and deflated.

In an embodiment, the neck pillow further comprises a second judgment unit, the second judgment unit comprises a pressure sensor, and the pressure sensor is disposed on the inner ring part; and, when a user's head deflects to the left or to the right, the pressure sensor receives pressure, and the power source drives an air pump to cause an airbag element receiving the pressure to be inflated.

Compared with the prior art, advantages of the present disclosure are as follows:

1. In the prior art, some neck pillows have multiple functional components centrally disposed on an inner ring part of a neck pillow, causing a weight at the position to be excessive, weights of two free ends of the neck pillow to be too small, and an overall center of gravity to be biased rearward, so that the neck pillow easily falls off toward a back of a neck during wearing, which does not conform to an ergonomic design. In addition, a component layout of some neck pillows is unreasonable, which affects a direct experience of a user. The present application solves the foregoing problems. By disposing the vibration unit in a middle of the inner ring part, disposing the control unit in a middle of the outer ring part, and reasonably distributing the power source, the air pump and other components in the first placement part and the second placement part, a weight distribution of the neck pillow is made more uniform, a problem of being uncomfortable to wear caused by a center of gravity shift is avoided, wearing stability is strong, the design conforms to an ergonomic design, and a wearing experience of the user is improved.
2. Different from the prior art, the neck pillow of the present application integrates a vibration massage function and an inflation support function. A mode can be easily switched through the buttons on the second upper cover to meet user needs in different scenarios. At the same time, the vibration function is capable of reminding the user to wake up from a sleep state, causing the user to change a head posture and alleviating a snoring situation. In addition, connection channels between various components are reasonably designed. A cooperation of the first channel, the second channel, and the third channel enables the vibration motors to obtain stable power supply support. Moreover, such an arrangement facilitates wiring arrangement and maintenance in the neck pillow.
3. Different from the prior art, the double-layer airbag of the present application provides better support and comfort, and the eccentric vibration motors in a vibration compartment can effectively massage neck muscles and relieve fatigue. A design of the arc-shaped vibration compartment fits a curve of a human neck, further improving the comfort of the neck pillow; on the other hand, when the double-layer airbag provides support, a head rotates, an airway is opened, and snoring stops or a snoring state is alleviated.

Embodiments of the present application are capable of achieving other advantageous technical effects not listed one by one, some of these other technical effects may be described below, and can be expected and understood by a person skilled in the art after reading the present application.

Figure 1:
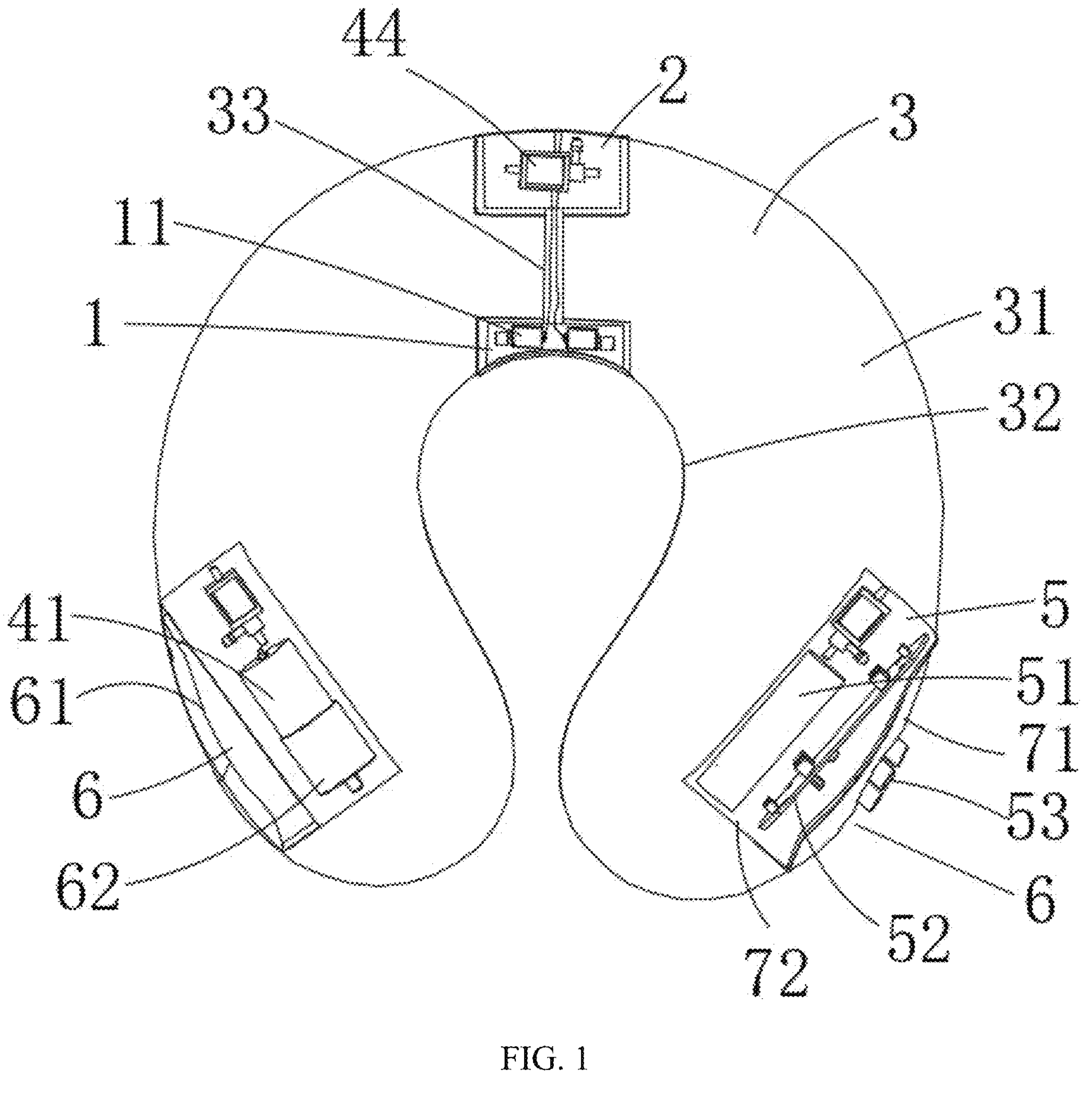
FIG. 1 is a schematic diagram of an overall structure of a neck pillow of the present disclosure.

The names of the parts referred to by the respective numerals in the drawings are as follows: 1: vibration unit; 11: vibration motor; 12: third channel; 13: arc-shaped housing; 131: arc-shaped surface; 14: cover; 2: control unit; 21: first channel; 3: pillow main body; 31: outer ring part; 32: inner ring part; 33: second channel; 4: inflation assembly; 41: air pump; 42: first airbag; 43: second airbag; 44: three-way valve; 5: power source; 51: battery; 52: circuit board; 53: button; 6: first placement part; 61: first upper cover; 62:

first lower cover; 7: second placement part; 71: second upper cover; 72: second lower cover.

DETAILED DESCRIPTION OF THE EMBODIMENTS

To make the objectives, features, and advantages of the present application more apparent and comprehensible, the present application is further described in detail below with reference to the accompanying drawings and specific embodiments. Apparently, the described embodiments are a part of the embodiments of the present application, but not all of the embodiments. Based on the embodiments in the present application, all other embodiments obtained by a person of ordinary skill in the art without making creative efforts shall fall within the protection scope of the present application.

The present application will be described in more detail below with reference to different embodiments and examples of several aspects of the present application.

In the present application, the term "inner" or "inner ring" refers to a side or a ring that fits against a neck, and the term "outer" or "outer ring" refers to a side or a ring that does not fit against the neck.

In the present application, the term "upper" or "above" refers to an upward direction when a user is standing while wearing the neck pillow, and the term "lower" or "below" refers to a downward direction when the user is standing while wearing the neck pillow.

SPECIFIC EMBODIMENT

Embodiment 1

Figure 2:
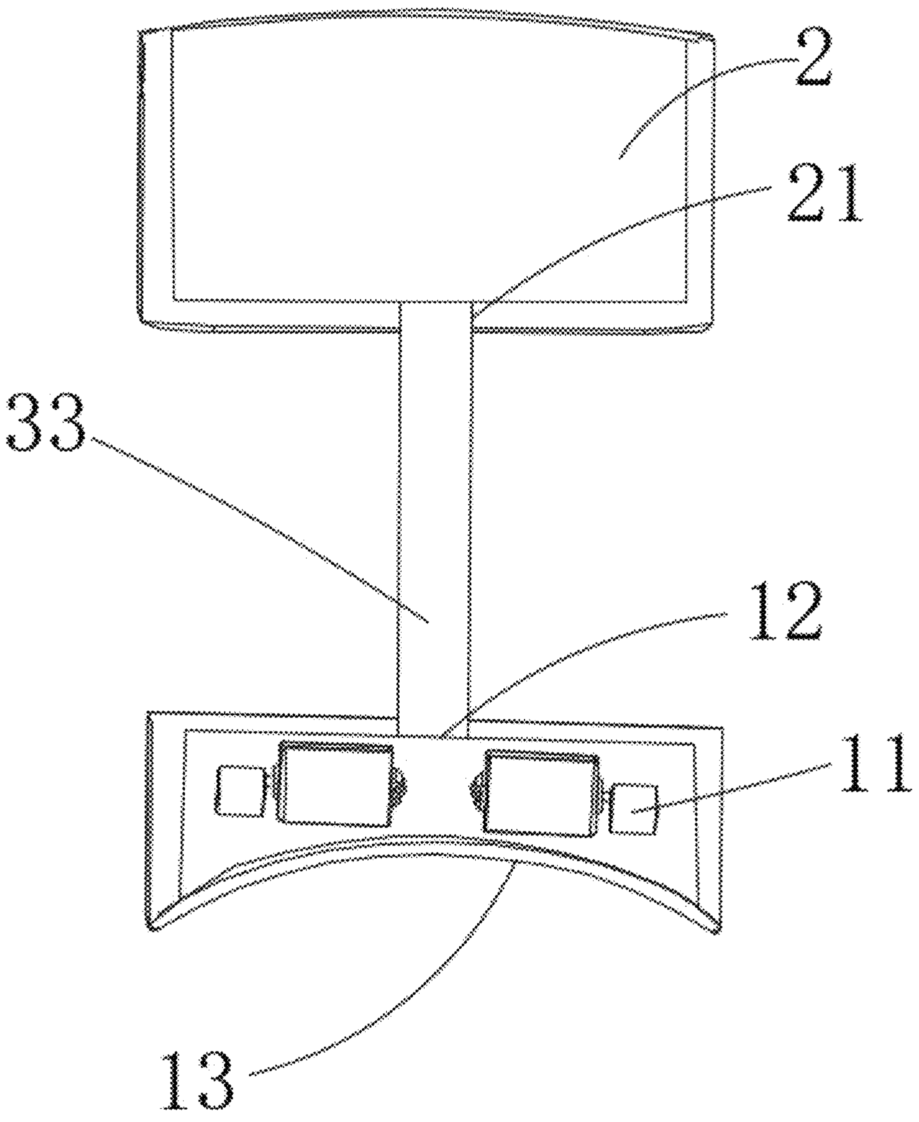
FIG. 2 is a connection schematic diagram of a first channel, a second channel, and a third channel of the present disclosure.

This embodiment provides a neck pillow with a vibration unit and a control unit (2), comprising a pillow main body (3), an inflation assembly (4), and a power source (5), as shown in FIG. 1. The pillow main body (3) comprises an inner ring part (32) and an outer ring part (31). The vibration unit (1) is disposed at a middle position of the inner ring part (32). The control unit (2) is disposed at a middle position of the outer ring part (31). And, a plurality of vibration motors (11) are disposed in the vibration unit (1). A control valve of the inflation assembly (4) is disposed in the control unit (2). The control unit (2) further comprises a first channel (21). The pillow main body (3) comprises a second channel (33). The first channel (21) and the second channel (33) are in communication, as shown in FIG. 2.

In this Embodiment 1, a first placement part (6) and a second placement part (7) are respectively disposed on left and right sides of the outer ring part (31), and the first placement part (6) and the second placement part (7) are symmetrically arranged relative to a center of the pillow main body (3).

In this Embodiment 1, the power source (5) further comprises wires. The vibration unit (1) comprises a third channel (12). The wires start from the second placement part (7), enter the control unit (2) along the outer ring part (31), and pass through the first channel (21), the second channel (33), and the third channel (12) to enter the vibration unit (1) and connect with the plurality of vibration motors (11).

In this Embodiment 1, the vibration unit (1) and the control unit (2) are disposed together on a center line of the pillow main body (3); and, a three-way valve (44) of the inflation assembly (4) is further fixed in the control unit (2).

In this Embodiment 1, the inflation assembly (4) comprises an air pump (41), and the air pump (41) is fixed in the first placement part (6); and, the first placement part (6) comprises a first lower cover (62) and a first upper cover (61).

In this Embodiment 1, the air pump (41) is connected to the power source (5).

In this Embodiment 1, the power source (5) controls the air pump (41) to inflate and deflate a first airbag (42) and a second airbag (43).

In this Embodiment 1, the power source (5) comprises a battery (51) and a circuit board (52), the circuit board (52) and the battery (51) are disposed in the second placement part (7); and, the second placement part (7) comprises a second upper cover (71) and a second lower cover (72).

In this Embodiment 1, two symmetrically arranged vibration motors (11) are disposed in the vibration unit (1), and the vibration motors (11) are eccentric vibration motors.

In this Embodiment 1, the eccentric vibration motors (11) are capable of reminding a user to wake up from a sleep state, change from deep sleep to light sleep, and change a head posture to stop snoring.

Figure 4:
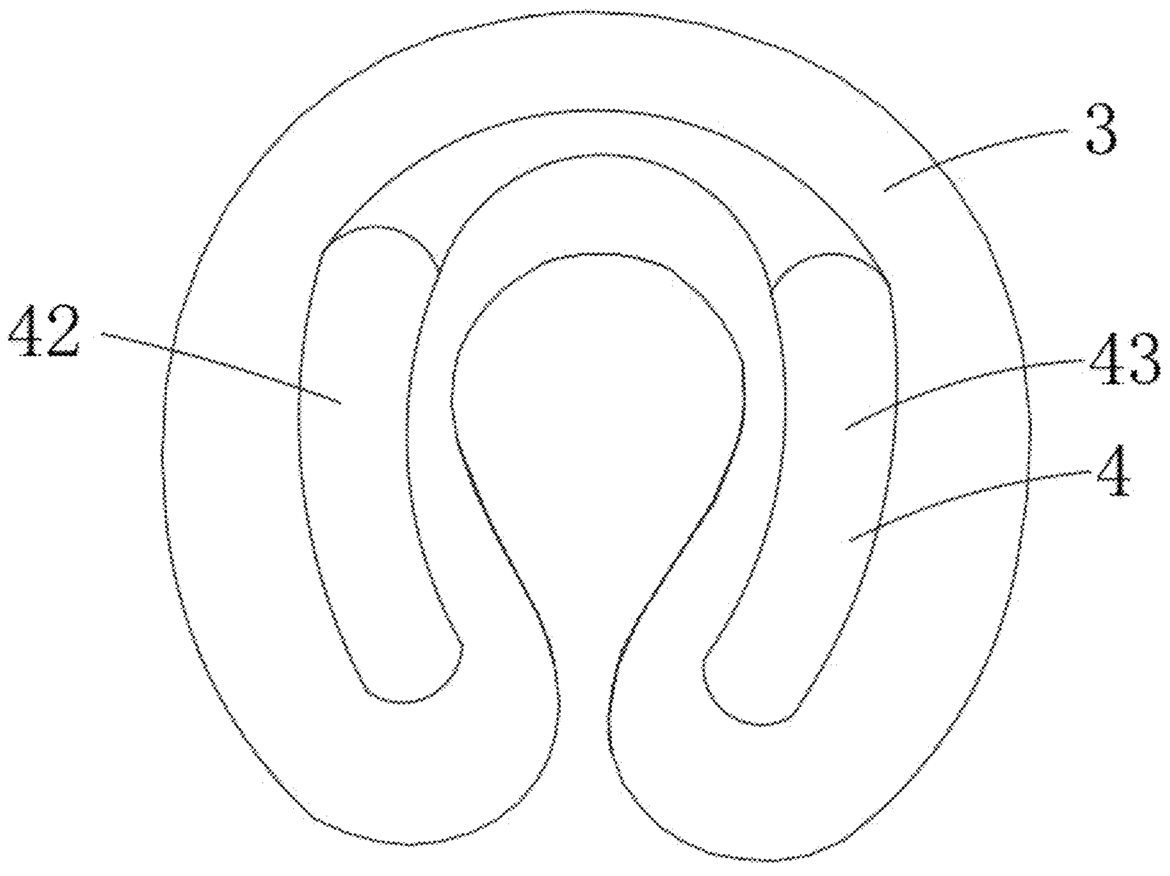
FIG. 4 is a schematic diagram of an inflation assembly of the present disclosure, where the inflation assembly comprises a first airbag and a second airbag.

In this Embodiment 1, the inflation assembly (4) further comprises a first airbag (42) and a second airbag (43), as shown in FIG. 4; and, the first airbag (42) and the second airbag (43) are both double-layer airbags.

In this Embodiment 1, when the first airbag (42) or the second airbag (43) is inflated, a motion direction of the first airbag (42) or the second airbag (43) is upward inflation or obliquely upward inflation, to support a user's lower jaw, and support a deflected head to make the deflected head upright.

Figure 3:
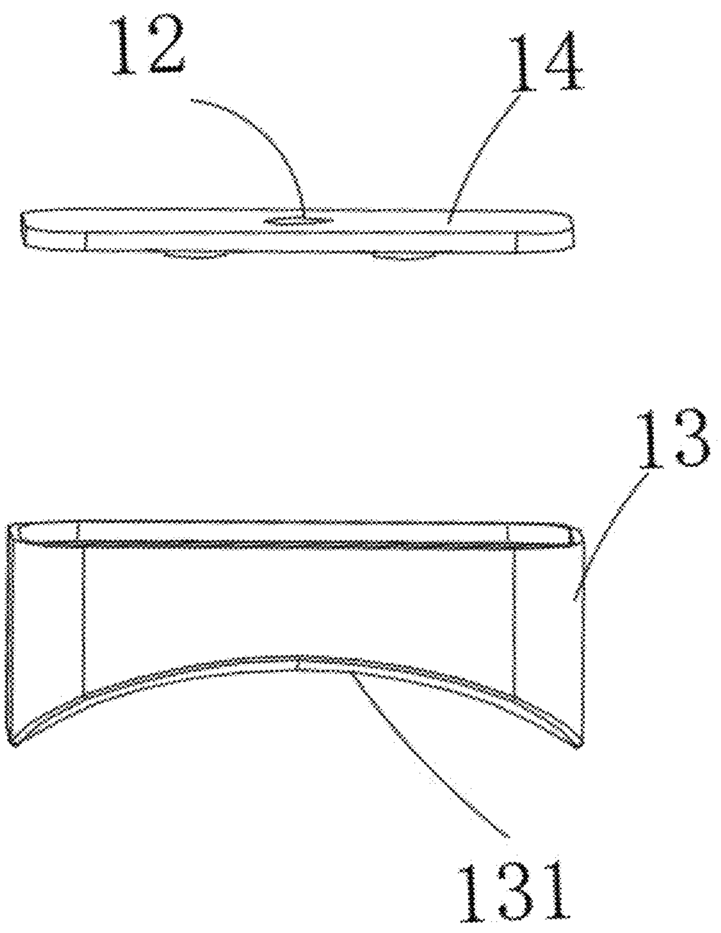
FIG. 3 is a schematic diagram of a housing of a vibration unit of the present disclosure.

In this Embodiment 1, the vibration unit (1) comprises an arc-shaped housing (13) and a cover (14), as shown in FIG. 3. The arc-shaped housing (13) comprises at least one arc-shaped surface (131), and two ends of the arc-shaped surface (131) are tangent to the inner ring part (32).

In this Embodiment 1, a plurality of buttons (53) are disposed on the second upper cover (71). The plurality of buttons (53) are used for switching a neck pillow mode. The neck pillow comprises at least a vibration mode and an inflation mode.

In this Embodiment 1, the neck pillow comprises a massage mode, and the power source (5) controls the vibration unit (1) to generate vibration.

In this Embodiment 1, the neck pillow further comprises a first judgment unit. The first judgment unit comprises a microphone sensor and a data acquisition collector. When the first judgment unit determines that a user is in a snoring state, a control system drives the vibration unit (1) to vibrate and/or drives an air pump (41) to cause the first airbag (42) or the second airbag (43) to be inflated and deflated.

In this Embodiment 1, the neck pillow further comprises a second judgment unit. The second judgment unit comprises a pressure sensor. The pressure sensor is disposed on the inner ring part (32); and, when a user's head deflects to the left or to the right, the pressure sensor receives pressure, and the power source (5) drives an air pump (41) to cause an airbag element receiving the pressure to be inflated.

In this Embodiment 1, the neck pillow enters a massage mode, power is supplied to the vibration motors (11) through the circuit board (52), the eccentric vibration motors (11) in a control compartment start to work and generate vibration, and the vibration is transmitted to a neck through a vibration compartment to realize massaging of neck muscles and relieve neck fatigue.

In this Embodiment 1, the neck pillow enters a sleep mode. When a user's head deflects to the left or to the right, the pressure sensor receives pressure, and the power source (5) drives an air pump (41) to cause the first airbag (42) or the second airbag (43) receiving the pressure to be inflated. The double-layer airbag gradually expands to provide support for a neck and a lower jaw.

An assembly process of the neck pillow provided by this embodiment is as follows:

First, the air pump (41) is installed between the first lower cover (62) and the first upper cover (61) of the first placement part (6), ensuring that the air pump (41) is fixed firmly; second, the battery (51) and the circuit board (52) are installed between the second lower cover (72) and the second upper cover (71) of the second placement part (7) to complete an assembly of the power source (5); the vibration motors (11) are installed in the arc-shaped housing (13) of a vibration compartment, then the cover (14) is put on, and the vibration compartment is installed at the middle position of the inner ring part (32), so that two ends of the arc-shaped surface (131) are tangent to the inner ring part (32); a control valve of the inflation assembly (4) is installed in a control compartment, and the first channel (21) of the control compartment is connected to the second channel (33) of the pillow main body (3); wires are led out from the second placement part (7), enter the control compartment along the outer ring part (31), and are connected to the vibration motors (11) in the vibration compartment through the first channel (21), the second channel (33), and the third channel (12) to complete a circuit connection; the first placement part (6) and the second placement part (7) are respectively installed on the left and right sides of the outer ring part (31), so that the first placement part (6) and the second placement part (7) are symmetrical relative to the center of the pillow main body (3); finally, the first airbag (42) and the second airbag (43) are installed at appropriate positions to ensure that the first airbag (42) and the second airbag (43) are connected to the inflation assembly (4) normally.

The foregoing description of several embodiments of the present application has been presented for purposes of illustration. The foregoing description is not intended to be exhaustive, nor to limit the present application to the precise configurations, structures, and/or steps disclosed. Apparently, according to the above teachings, many modifications and variations can be made by a person of ordinary skill in the art without departing from the concept of the present disclosure, and these all fall within the protection scope of the present disclosure. Therefore, the protection scope of the patent of the present disclosure should be subject to the appended claims.

What is claimed is:

1. A neck pillow with a vibration unit and a control unit, comprising a pillow main body, an inflation assembly, and a power source, wherein the pillow main body comprises an inner ring part and an outer ring part, the vibration unit is disposed at a middle position of the inner ring part, the control unit is disposed at a middle position of the outer ring part, a plurality of vibration motors are disposed in the vibration unit, a control valve of the inflation assembly is disposed in the control unit, the control unit further comprises a first channel, the pillow main body comprises a second channel, and the first channel and the second channel are in communication.

2. The neck pillow with a vibration unit and a control unit according to claim 1, wherein a first placement part and a second placement part are respectively disposed on left and right sides of the outer ring part, and the first placement part and the second placement part are symmetrically arranged relative to a center of the pillow main body.

3. The neck pillow with a vibration unit and a control unit according to claim 2, wherein the power source further comprises wires, the vibration unit comprises a third channel, and the wires start from the second placement part, enter the control unit along the outer ring part, pass through the first channel, the second channel, and the third channel to enter the vibration unit and connect with the plurality of vibration motors.

4. The neck pillow with a vibration unit and a control unit according to claim 1, wherein the vibration unit and the control unit are disposed together on a center line of the pillow main body; and a three-way valve of the inflation assembly is further fixed in the control unit.

5. The neck pillow with a vibration unit and a control unit according to claim 2, wherein the inflation assembly comprises an air pump, and the air pump is fixed in the first placement part; and the first placement part comprises a first lower cover and a first upper cover.

6. The neck pillow with a vibration unit and a control unit according to claim 2, wherein the power source comprises a battery and a circuit board, the circuit board and the battery are disposed in the second placement part; and the second placement part comprises a second upper cover and a second lower cover.

7. The neck pillow with a vibration unit and a control unit according to claim 1, wherein two symmetrically arranged vibration motors are disposed in the vibration unit, and the vibration motors are eccentric vibration motors.

8. The neck pillow with a vibration unit and a control unit according to claim 1, wherein the inflation assembly further comprises a first airbag and a second airbag; and the first airbag and the second airbag are both double-layer airbags.

9. The neck pillow with a vibration unit and a control unit according to claim 3, wherein the vibration unit comprises an arc-shaped housing and a cover, the arc-shaped housing comprises at least one arc-shaped surface, and two ends of the arc-shaped surface are tangent to the inner ring part; and the third channel is disposed on the cover.

10. The neck pillow with a vibration unit and a control unit according to claim 6, wherein a plurality of buttons are disposed on the second upper cover, the plurality of buttons are used for switching a neck pillow mode, and the neck pillow comprises at least a vibration mode and an inflation mode.

* * * * *